Oct. 29, 1946.     I. V. FALK     2,410,155
PROPELLER GOVERNOR TESTER
Filed May 15, 1944     2 Sheets-Sheet 1

INVENTOR.
IRVIN V. FALK,
BY Hood & Hahn
ATTORNEYS.

Oct. 29, 1946.  I. V. FALK  2,410,155
PROPELLER GOVERNOR TESTER
Filed May 15, 1944  2 Sheets-Sheet 2
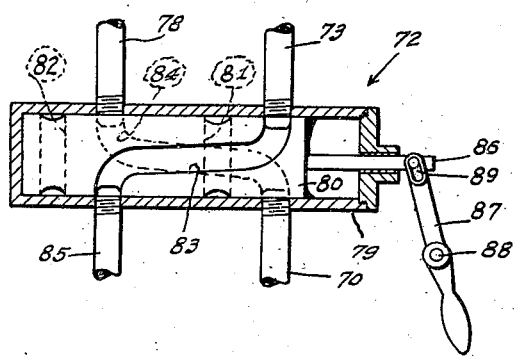
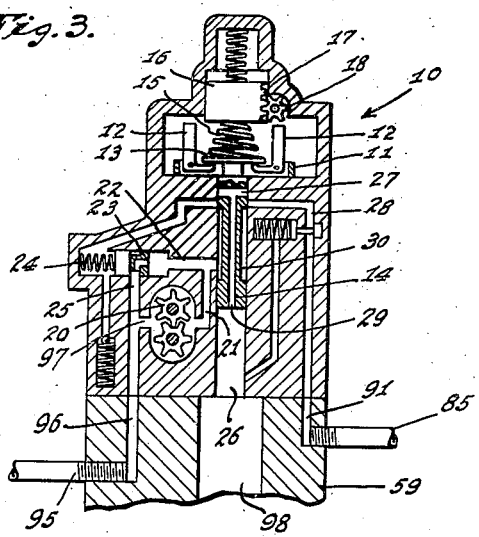
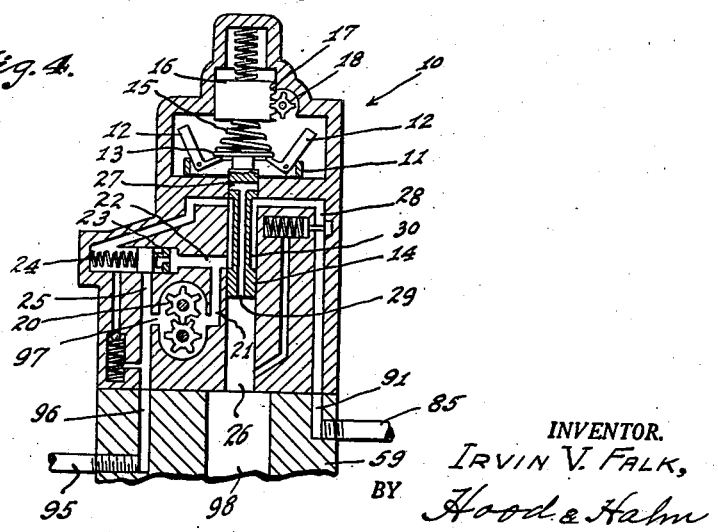
INVENTOR.
IRVIN V. FALK,
BY Hood & Hahn
ATTORNEYS.

Patented Oct. 29, 1946

2,410,155

UNITED STATES PATENT OFFICE 2,410,155

PROPELLER GOVERNOR TESTER

Irvin V. Falk, Union, N. J., assignor to Reeves Pulley Company, Columbus, Ind., a corporation of Indiana Application May 15, 1944, Serial No. 535,693

14 Claims. (Cl. 73—1)

The present invention relates to a propeller governor tester, and is disclosed in connection with a commercial governor designed to adjust the pitch of an airplane propeller to optimum positions for varying conditions of aircraft operation. The governor disclosed is of a type which, in response to variations in engine speed, controls the rate and direction of flow of fluid (oil, in this case) to a piston connected to adjust the propeller pitch, so that an increase in engine speed will result in an increase in the "bite" of the propeller, thus increasing the load on the engine to retard the engine; and vice versa.

The present invention is not concerned with the propeller adjusting mechanism, or with the construction of the governor; but with a test stand comprising mechanism for simulating engine conditions, and impressing speed changes upon such a governor, the stand being so designed as to respond to the operation of the governor mechanism to vary the rate at which the governor mechanism is driven in response to the demands of that mechanism. A further object of the invention is to provide a test stand of the character described which shall be highly flexible, so that it may be adapted to the testing of various forms of governor mechanisms.

To the accomplishment of the above and related objects, my invention may be embodied in the form illustrated in the accompanying drawings, attention being called to the fact, however, that the drawings are illustrative only, and that changes may be made in the specific construction illustrated and described, so long as the scope of the appended claims is not violated.

Fig. 2 is an enlarged section through a detail of the test stand mechanism; and

Figs. 3 and 4 are sectional views of a governor mechanism in various positions of adjustment.

Figure 1:
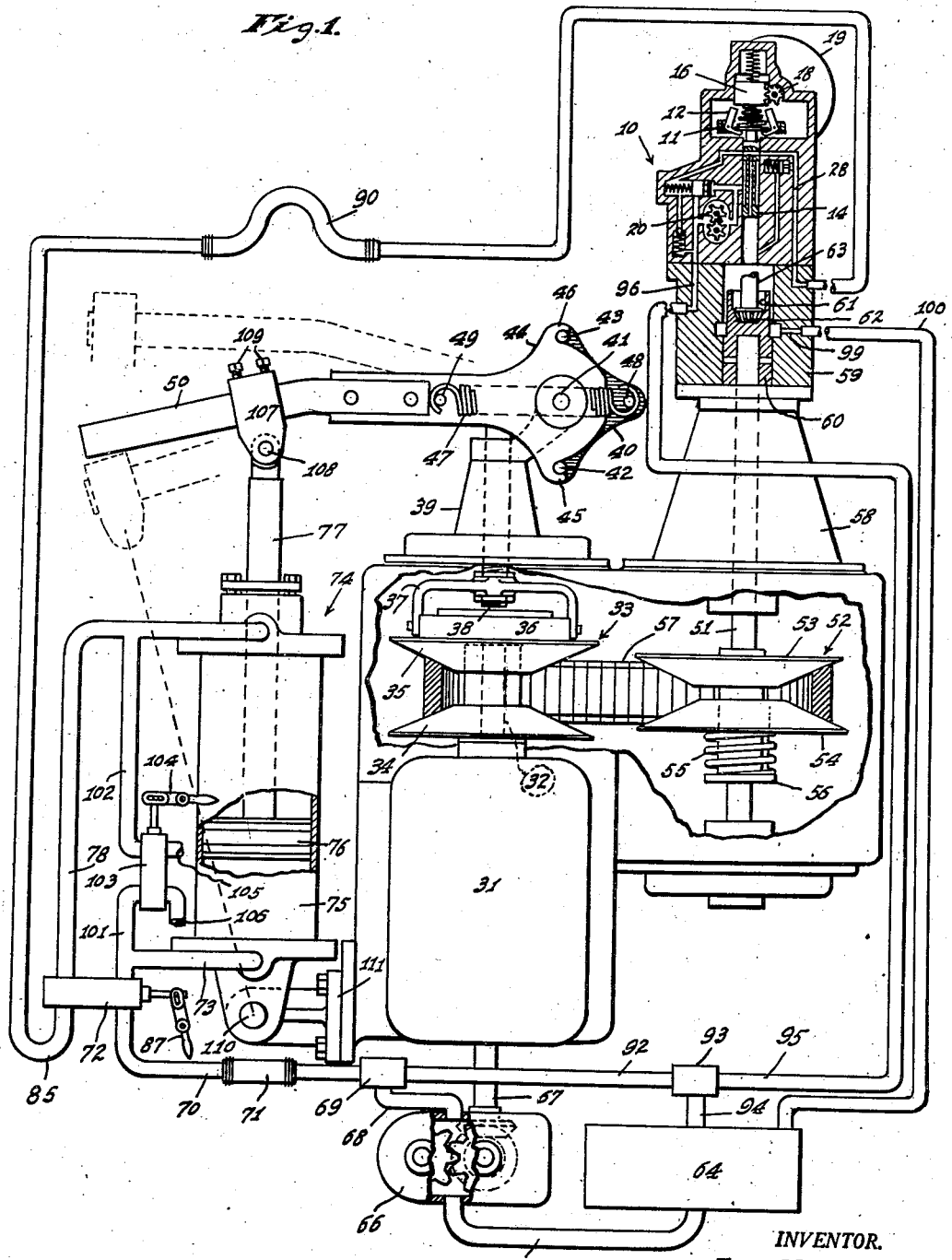
Fig. 1 is a diagrammatic illustration of my test stand with a commercial governor mechanism associated therewith, parts being broken away or shown in section for clarity of illustration.

In Fig. 1, the reference numeral 10 indicates generally a commercial form of governor mechanism primarily constructed for the automatic control of controllable pitch aircraft propellers. The governor mechanism is illustrated, in Fig. 1, in "under-speed" position. In Figs. 3 and 4, the mechanism is illustrated in, respectively, "on-speed" and "over-speed" positions.

The selected governor mechanism comprises a rotor 11 carrying centrifugal fly weights 12, 12, each provided with a finger underlying a disc 13 (see Fig. 3) at the upper end of a reciprocable valve body 14 which is urged, by a spring 15, toward the position illustrated in Fig. 1. A plunger 16 constitutes an abutment for the upper end of spring 15, and said plunger is provided with rack teeth 17 meshing with a pinion 18 adapted to be adjusted by manipulation of a hand wheel, or the like, 19, (Fig. 1) whereby to adjust the position of the plunger 16 and the degree of pressure exerted by the spring 15 upon the disc 13. It will be obvious that such adjustment of the plunger 16 will vary the speed of the rotor 11 at which the fly weights 12 will assume the "on-speed" position of Fig. 3.

The governor mechanism includes a gear type pump 20 adapted to discharge fluid through a passage 21 to a passage 22, one end of which communicates, through a valve 23 biased to closed position by a spring 24, with a passage 25 for a purpose later to be described.

The valve 14 is reciprocably mounted in a bore 26; and, near its upper end, said valve is formed with a port 27 adapted, under "under-speed" conditions, to register with a passage 28. The port 27 communicates with a bore 29 which opens into the bore 26. The valve body 14 is further formed, intermediate its ends, with a reduced section 30, providing a circumferential space which, in the "over-speed" position of Fig. 4, establishes communication between the passage 22 and the passage 28.

In the position of Fig. 3, all flow passages are sealed from each other, except that the pressure produced by the operation of the pump 20 will depress the valve 23 against the tendency of the spring 24, thus moving the valve 23 to the position illustrated in Fig. 3, to establish a flow circuit from the pump outlet 21 through passage 22, valve 23, and passage 25, back to the pump inlet 97.

In the "under-speed" position of Fig. 1, the port 27 registers with the passage 28 to permit fluid to flow from said passage 28 through the port 27 and bore 29 to the bore 26. In the "over-speed" position of Fig. 4, a flow path is established from the pump outlet 21 through the passage 22, past the reduced section 30 of the valve 14, and to the passage 28. The effect of these various positions upon the parts of the test stand, and the results thereof upon the parts of the governor mechanism will become apparent as the description proceeds.

The test stand includes an electric motor 31 upon the spindle 32 of which is mounted a variable-effective-diameter pulley, indicated generally by the reference numeral 33. Said pulley comprises a coned disc 34 fixed to the spindle 32, and a mating coned disc 35 axially shiftable relative to said spindle 32. The shifting mechanism for said disc 35 comprises a thrust bearing 36 to which is operatively connected a yoke 37 adjustably mounted upon a stem 38 reciprocably carried in a guide sleeve 39. A lever 40 is pivotally mounted at 41 upon a bracket carried by said guide sleeve 39, and is operatively connected to cause reciprocation of the stem 38 in response to oscillation of said lever 40. The lever 40 carries a pair of pins 42 and 43 diametrically opposed with respect to the fulcrum 41 for the lever 40, and a cooperating lever 44 is provided with ears 45 and 46 respectively supported upon said pins 42 and 43. The lever 44 may preferably take the form of a yoke straddling the lever 40, and provided on both sides of said lever 40 with ears 45 and 46 cooperating with opposite projections of the pins 42 and 43. A spring 47, hooked over pins 48 and 49 upon the levers 40 and 44, respectively, normally holds both ears of the lever 44 in contact with the pins 42 and 43; but if a force tends to move the lever 44 beyond either limiting position of the lever 40, the lever 44 will simply pivot about one or the other of the pins 42 and 43, thus stretching the spring 47. Upon relaxation of the force applied to the lever 44, the spring 47 will return said lever 44 to its illustrated position with respect to the lever 40.

A bar 50, comprising an extension of the lever 44, is formed to provide a portion bent downwardly in the manner illustrated for a purpose later to become apparent.

Suitably journalled in parallelism with the motor spindle 32 is a driven shaft 51 carrying a variable-effective-diameter pulley indicated generally by the reference numeral 52 and comprising a coned disc 53 fixed to the shaft 51 and a mating coned disc 54 axially shiftable with respect thereto. A coiled spring 55 sleeved on the shaft 51 bears at one end against the disc 54 and at its opposite end against a fixed abutment 56, tending constantly to urge the disc 54 toward the disc 53. An edge-active belt 57 provides a driving connection between the pulleys 33 and 52. It will be clear that, as the disc 35 is moved toward the disc 34, the belt 57 will be squeezed outwardly between the two discs, thereby increasing the effective driving diameter of the pulley 33. Correspondingly, the belt 57 will be drawn inwardly between the discs 53 and 54, thus forcing the disc 54 to move, against the tendency of the spring 55, away from the disc 53, thus decreasing the effective diameter of the pulley 52, to increase the output speed of the shaft 51. Similarly, when the disc 35 is moved away from the disc 34, the tension upon the belt 57 is relaxed, whereby the spring 55 is permitted to force the disc 54 toward the disc 53. Thus the effective diameter of the pulley 33 is reduced, the effective diameter of the pulley 52 is increased, and the output speed of the shaft 51 is decreased.

An adapter bracket 58 supports a pillow block 59 which is formed to provide a journal mounting for a block 60, fixed to the driven shaft 51, and provided with a socket 61 formed to provide a driving seat for a bevel gear 62 at the end of the operating shaft 63 for the governor mechanism 10. As is well understood in the art, the shaft 63 is connected to drive the governor pump 20 and the governor rotor 11. The details of this drive are immaterial to the present invention, and are well known in the art, an example being shown in the patent to E. Martin, No. 2,264,089, issued November 25, 1941; and therefore such details are not specifically disclosed herein. Suffice it to say that, in view of the illustrated connection, it will be clear that the pump 20 and the rotor 11 of the governor mechanism 10 will be driven at varying speeds corresponding to the speeds of the shaft 51 resulting from adjustments of the lever 40 to shift the disc 35.

The test stand includes an oil reservoir 64 from which leads a supply pipe 65 connected to the inlet of a gear type pump 66 driven by the shaft extension 67 of the motor 31. From the outlet of the pump 66 leads a short pipe section 68 communicating with a pressure regulating device 69.

The pressure regulating device 69 is preferably constructed to maintain a constant fluid pressure of, say, one hundred pounds per square inch in the supply conduit 70, in which is connected a flexible section 71. The conduit 70 leads through a four-way valve 72 to conduits connected with the opposite ends of a fluid motor, indicated generally by the reference numeral 74.

The motor 74 comprises a cylinder 75, pivotally supported at 110 upon a bracket 111 which may be supported upon the base which mounts the motor 31. Reciprocably mounted within the cylinder 75 is a piston 76 having a stem 77 projecting from the end of the cylinder 75 remote from the pivotal mounting 110. A conduit 78 communicates with the lower end of the cylinder 75 and a conduit 78 communicates with the upper end thereof.

The four-way valve 72 is illustrated in detail in Fig. 2. Its function is to connect the opposite ends of the cylinder 75 alternatively with the supply line 70. Said valve comprises a casing 79 within which is mounted a valve body 80 formed with two straight-through passages 81 and 82, and with crossed passages 83 and 84. In the illustrated position, it will be seen that the passage 83 connects the conduit 73, communicating with the lower end of the cylinder 75, with the conduit 85, while the passage 84 connects the supply line 70 with the conduit 78 communicating with the upper end of the cylinder. The valve body 80 is provided with a stem 86 projecting from the housing 79; and an actuating lever 87, suitably pivotally mounted as at 88, has a lost motion connection 89 with said stem 86. Clockwise movement of the lever 87 will shift the valve body 80 to its opposite position, in which the passage 81 will establish communication between the supply line 70 and the conduit 73 leading to the lower end of the cylinder 75, while the passage 82 will connect the conduit 78 leading from the upper end of the cylinder 75 with the conduit 85.

When the test stand is being used to test a governor of the character illustrated herein, the valve 72 will always be maintained either in the position illustrated in Fig. 2, or, under special circumstances, in its intermediate position in which the supply line 70 and the conduit 85 are entirely disconnected from the fluid motor 74. The opposite position of the valve 72 is for use in connection with a different type of governor mechanism.

The conduit 85 is provided with a flexible section 90, and leads to a passage 91 in the pillow block 59 which, when the governor mechanism illustrated herein is in position for test, registers with the passage 28 thereof.

A conduit 92 leads from the pressure regulating mechanism 69 to a T-fitting 93 communicating, through a pipe 94, with the reservoir 64. The regulating mechanism 69 is so constructed that, when the fluid pressure therein materially exceeds the above-mentioned predetermined value of, say, one hundred pounds per square inch, flow is permitted through said regulating device and the conduit 92 to the reservoir 64.

A further conduit 95 leads from the T-fitting 93 to a passage 96 in the pillow block 59 which, when the governor mechanism illustrated herein is in position for test, registers with the passage 25 of said governor mechanism. The pillow block is further formed with a bore 98 into which opens the bore 26 of the governor mechanism, and from which leads a passage 99 with which is connected a conduit 100 leading to the reservoir 64.

The conduit 73 has a branch 101 and the conduit 78 has a branch 102, which branches lead through a four-way valve 103 similar to the valve 72. From said valve 103 are extended a conduit 105 leading to the delivery side of the pump 66, and a conduit 106 leading to the reservoir 64. In the illustrated position of the actuating lever 104, the branches 101 and 102 are blocked. In one extreme position of said lever, however, the conduit 105 will be connected with the branch 102, while the branch 101 will be connected with the conduit 106 whereby fluid under pressure will be supplied to the upper end of the cylinder 75 and the lower end of said cylinder will be connected to the reservoir 64. Thus, the piston 76 will be moved downwardly in the cylinder 75 to shift the disc 35 toward the disc 34, thus increasing the speed of the shaft 51. In the opposite extreme position of the lever 104, the branch 101 will be connected to the conduit 105 while the branch 102 is connected to the conduit 106, whereby fluid under pressure will be supplied to the lower end of the cylinder 75, the upper end of said cylinder will be vented, and the disc 35 will be moved away from the disc 34 to reduce the speed of the shaft 51. Of course, during any such preliminary adjustment of the mechanism the lever 87 will be in its intermediate position, locking the fluid motor 74 against any influence under the control of the governor mechanism 10.

The piston 76 is connected to shift the disc 35 by means of a link 107 pivotally connected at 108 to the piston stem 77 and adapted to embrace the lever 50, being secured thereto by set screws 109. Because of the pivotal mounting of the cylinder 75 at 110, it will be clear that the yoke 107 may be secured to the lever 50 at any one of a plurality of points differently spaced from the pivotal axis 41 of said lever. Thereby, the volume of fluid required to be delivered to the fluid motor 74 in order to effect a given degree of adjustment of the disc 35 may be varied to fit desired operating conditions.

When a governor mechanism to be tested has been suitably associated with the pillow block 59, the lever 87 being in its intermediate position, the motor 31 is energized, and the position of the piston 76 and lever 40 will be adjusted, by manipulation of the lever 104, to bring the governor parts into the position of Fig. 3. The positions of the parts under these conditions of equilibrium are now noted, and then the lever 104 is further manipulated to reduce the speed of the shaft 51 to a value approximately 600 R. P. M lower than the equilibrium value. Now the lever 104 is set in its intermediate position and the lever 87 is set in the position illustrated in Fig. 1. Because of the lower speed, the governor parts will now assume the positions illustrated in Fig. 1.

With the parts in these positions, the lower end of the cylinder 75 is vented through the conduit 73, passage 83, conduit 85, passage 91, passage 28, port 27, bore 29, bore 26, sump 98, passage 99, and conduit 100 to the reservoir 64. Fluid under the pressure of the pump 66 is therefore supplied, through the conduit 68, regulator mechanism 69, conduit 70, passage 84, and conduit 78, to the upper end of the cylinder 75 to move the piston 76 downward, thus swinging the lever 44 and the lever 40 in a counter clockwise direction to shift the disc 35 toward the disc 34 to increase the speed of the shaft 51 and of the governor mechanism. As speed of the governor mechanism is increased, it ultimately reaches a value at which the fly weights 12 will assume the positions illustrated in Fig. 3, at which instant communication between the passage 28 and the bore 29 is cut off so that further flow of fluid from the lower end of the cylinder 75 is prevented. This is the condition of equilibrium which will be maintained by the mechanism unless some further extraneous adjustment is made.

The speed of the shaft 51 may be further increased either by manipulation of the lever 104 or by manipulation of the hand wheel 19. If the adjustment is made by manipulation of the lever 104, such increase in the speed of the shaft 51 will cause the fly weights to move toward the position illustrated in Fig. 4, thus further lifting the valve 14 to establish communication between the outlet 21 of the pump 20 and the passage 28.

The fluid pressure produced by the pump 20 is considerably higher than that produced by the pump 66. Consequently, when the valve 14 assumes the position of Fig. 4, fluid will flow from the pump 20 through the passages 21 and 22, around the reduced section 30 of the valve 14, and through passage 28, passage 91, conduit 85, passage 83, and conduit 73 to the lower end of the cylinder 75. There, acting upon the piston 76 at a pressure higher than the pressure supplied by the pump 66, the fluid will cause upward movement of the piston 76, crowding fluid out of the upper end of the cylinder 75 through the conduit 78, passage 84, and conduit 70 to the regulator mechanism 69. Such flow of fluid to the regulator mechanism 69 will increase the pressure within said mechanism beyond that for which the valve at the right end thereof is set, and that valve will open to permit flow of fluid through the conduit 92, the fitting 93, and conduit 94 to the reservoir 64. Of course, the fluid driven by the pump 20 will be drawn thereto either from the reservoir 64 or from the conduit 92 through the T-fitting 93, conduit 95, and passages 96, 25, and 97.

Such upward movement of the piston 76 will shift the disc 35 away from the disc 34 to reduce the speed of the shaft 51, thus returning that speed to the value at which the fly weights 12 will assume the position illustrated in Fig. 3 in which the valve 14 cuts off communication between the pump outlet 21 and the passage 28.

If, instead of manipulating the valve 104, the operator shifts the hand wheel 19 to increase the compression of the spring 15, the fly weights 12, at a given speed of the rotor 11, will be swung inwardly by that increase in spring pressure, thus returning the valve 14 to the position illustrated in Fig. 1. Under these circumstances, the cycle first above described will be followed to increase the speed of the shaft 51 to a new value of equilibrium.

One of the points to be determined in testing governor mechanisms of the type here under consideration is the time required for the governor to pass a sufficient volume of fluid to bring the governor speed from a value 600 R. P. M. below optimum to the optimum, or equilibrium value. It is sometimes found that the adjustment is made so quickly as not to be feasibly measurable. In such a case, the flexible construction of the present test stand makes it possible to increase that time interval without modifying the construction or connections of the governor mechanism. If the link 107 is shifted to a position farther from the axis of oscillation of the lever 40, a greater degree of movement of the piston 76 will be required to effect a given degree of movement of the disc 35. Thus, by so shifting the position of the link 107, the volume of fluid required to be passed by the governor mechanism to produce a speed increase of 600 R. P. M., and therefore the time interval required to produce that speed increase, can be materially enlarged.

I claim as my invention:

1. For use with a governor including a fluid pump, a rotor, means connected to drive said pump and said rotor, speed-responsive means operatively associated with said rotor and connected to shift a valve oppositely, in response to opposite variations in the speed of said rotor, between a high-speed position and a low-speed position through an intermediate position; testing apparatus comprising a source of fluid under constant pressure, a fluid motor including a cylinder and a piston reciprocable therein, conduit means connecting said fluid source with said cylinder on one side of said piston, conduit means connecting said cylinder on the other side of said piston with said valve, passages controlled by said valve for alternatively placing said last-named conduit means in communication with said pump or with exhaust, a shaft connected to drive said pump and said rotor, and means for driving said shaft at variable speeds, said last-named means including an element shiftable oppositely to vary oppositely the speed of said shaft, and said fluid motor being connected to shift said shiftable element.

2. For use with a governor including a fluid pump, a rotor, means connected to drive said pump and said rotor, speed-responsive means operatively associated with said rotor and connected to shift a valve oppositely, in response to opposite variations in the speed of said rotor, between a high-speed position and a low-speed position through an intermediate position; testing apparatus comprising a source of fluid under constant pressure, a fluid motor including a cylinder and a piston reciprocable therein, conduit means connecting said fluid source with said cylinder on one side of said piston, conduit means connecting said cylinder on the other side of said piston with said valve, passages controlled by said valve for placing said last-named conduit means in communication with said pump when said valve is in its high-speed position and for placing said last-named conduit means in communication with exhaust when said valve is in its low-speed position, said valve closing said last-named conduit means when in intermediate position, a shaft connected to drive said pump and said rotor, and means for driving said shaft at variable speeds, said last-named means including an element shiftable oppositely to vary oppositely the speed of said shaft, and said fluid motor being connected to shift said shiftable element.

3. In a test stand, a fluid pump having an inlet and an outlet, a fluid motor comprising a cylinder and a piston reciprocable therein, a fluid reservoir, conduit means connecting said reservoir with said inlet, conduit means connecting said outlet with one end of said cylinder, pressure-regulating means in said last-named conduit means for maintaining substantially constant the pressure in such conduit means, conduit means communicating with the opposite end of said cylinder, speed-responsive means for controlling the rate and direction of flow through said last-named conduit means, and means for driving said speed-responsive means comprising a shaft, a driver connected to drive said shaft, and an element shiftable oppositely to vary oppositely the speed of rotation of said shaft, said piston being operatively connected to shift said element.

4. In a device of the class described, a fluid reservoir, a fluid pump having an inlet and an outlet, a first conduit connecting said reservoir with said pump inlet, a fluid motor comprising a cylinder and a piston reciprocable therein, a second conduit connecting said pump outlet with one end of said cylinder, a third conduit communicating with the other end of said cylinder, a fourth conduit communicating with said reservoir, a driving shaft, a driven shaft, means connecting said driving shaft to drive said driven shaft including an element shiftable oppositely to vary oppositely the speed ratio between said shafts, means connecting said piston to shift said shiftable element, and means operable by said driven shaft for controlling the rate and direction of fluid flow through said conduits, in response to variations in the speed of said driven shaft.

5. The combination with a driving shaft, a driven shaft, and means connecting said driving shaft to drive said driven shaft at variable speeds including an element shiftable oppositely to vary oppositely the speed ratio between said shafts, of a fluid motor including a cylinder and a piston reciprocable therein, said piston being operatively connected to shift said element, means for constantly impressing a predetermined fluid pressure upon one side of said piston, a source of fluid under higher pressure, and valve means effective at times to establish communication between the opposite side of said piston and said source, at other times to establish communication between said opposite side of said piston and exhaust, and at other times to close communication with said opposite side of said piston, said valve means being responsive to the speed of said driven shaft.

6. A test stand for governor mechanism of the type including a fluid pump and a variably-driven element operable in response to speed variations to shift a valve from a position establishing communication between a first port and an exhaust through a position closing both of said ports, to a position establishing communication between the delivery port of said pump and said first port, said stand comprising a driven shaft connectible to drive said variably-driven element, a driving shaft, means connecting said driving shaft to drive said driven shaft including an element shiftable oppositely to vary oppositely the speed of said driven shaft, a stand fluid pump, a fluid motor comprising a cylinder and a piston reciprocable therein, a conduit providing communication between the outlet of said stand fluid pump and one end of said cylinder, a conduit connected to the other end of said cylinder and connectible with said first port of said governor mechanism, and means connecting said piston to shift said shiftable element.

7. A test stand for governor mechanism of the type including a fluid pump and a variably-driven element operable in response to speed variations to shift a valve from a position establishing communication between a first port and an exhaust through a position closing both of said ports, to a position establishing communication between the delivery port of said pump and said first port, said stand comprising a driven shaft connectible to drive said variably-driven element, a driving shaft, means connecting said driving shaft to drive said driven shaft including an element shiftable oppositely to vary oppositely the speed of said driven shaft, a fluid reservoir, a stand fluid pump having an inlet and an outlet, a fluid motor comprising a cylinder and a piston reciprocable therein, a first conduit means connecting said stand fluid pump inlet with said reservoir, a second conduit means connecting said stand fluid pump outlet with one end of said cylinder, a third conduit means connecting said second conduit means and said stand fluid pump outlet with said reservoir, pressure-responsive flow-controlling means operable to prevent fluid flow through said third conduit means toward said reservoir at pressures below a predetermined value, a fourth conduit means communicating with the opposite end of said cylinder and connectible with the first port of such governor mechanism, a fifth conduit means communicating with said reservoir and connectible with the intake of said governor fluid pump, a sixth conduit means connectible with said governor mechanism exhaust and leading to said reservoir and means connecting said piston to shift said shiftable element.

8. A test stand for governor mechanism of the type including a fluid pump and a variably-driven element operable in response to speed variations to shift a valve from a position establishing communication between a first port and an exhaust through a position closing both of said ports, to a position establishing communication between the delivery port of said pump and said first port, said stand comprising a driven shaft connectible to drive said variably-driven element, a driving shaft, means connecting said driving shaft to drive said driven shaft including an element shiftable oppositely to vary oppositely the speed of said driven shaft, a source of fluid under pressure, a fluid motor comprising a cylinder and a piston reciprocable therein, a first conduit means connected to one end of said cylinder, a second conduit means connected to the opposite end of said cylinder, a third conduit means leading from said source, a fourth conduit means connectible to said first port of said governor mechanism, valve means associated with said conduit means and shiftable between a position connecting said first conduit means with said third conduit means and said second conduit means with said fourth conduit means, and a position connecting said first conduit means with said fourth conduit means and said second conduit means with said third conduit means, and means connecting said piston to shift said governor mechanism.

9. A test stand for governor mechanism of the type including a fluid pump and a variably-driven element operable in response to speed variations to shift a valve from a position establishing communication between a first port and an exhaust through a position closing both of said ports, to a position establishing communication between the delivery port of said pump and said first port, said stand comprising a driven shaft connectible to drive said variably-driven element, a driving shaft, means connecting said driving shaft to drive said driven shaft including an element shiftable oppositely to vary oppositely the speed of said driven shaft, a source of fluid under pressure, a fluid motor comprising a cylinder and a piston reciprocable therein, a first conduit means connected to one end of said cylinder, a second conduit means connected to the opposite end of said cylinder, a third conduit means leading from said source, a fourth conduit means connectible to said first port of said governor mechanism, valve means associated with said conduit means and shiftable between a position connecting said first conduit means with said third conduit means and said second conduit means with said fourth conduit means, and a position connecting said first conduit means with said fourth conduit means and said second conduit means with said third conduit means, a pressure-responsive exhaust valve in said third conduit means, said valve means being operable to vent said third conduit means only when the pressure therein exceeds the pressure of said source by a predetermined amount, and means connecting said piston to shift said governor mechanism.

10. A test stand for governor mechanism of the type including a fluid pump and a variably-driven element operable in response to speed variations to shift a valve from a position establishing communication between a first port and an exhaust through a position closing both of said ports, to a position establishing communication between the delivery port of said pump and said first port, said stand comprising a driven shaft connectible to drive said variably-driven element, a driving shaft, means connecting said driving shaft to drive said driven shaft including an element shiftable oppositely to vary oppositely the speed of said driven shaft, a source of fluid under pressure, a fluid motor comprising a cylinder and a piston reciprocable therein, a first conduit means connected to one end of said cylinder, a second conduit means connected to the opposite end of said cylinder, a third conduit means leading from said source, a fourth conduit means connectible to said first port of said governor mechanism, valve means associated with said conduit means and shiftable between a position connecting said first conduit means with said third conduit means and said second conduit means with said fourth conduit means, and a position connecting said first conduit means with said fourth conduit means and said second conduit means with said third conduit means, means independent of said conduit means for supplying fluid under pressure to either end of said cylinder while venting the other end of said cylinder, and means for connecting said piston to shift said governor mechanism.

11. The combination of claim 3 in which the operative connection between said piston and said shiftable element comprises a pivoted lever operatively connected to said shiftable element, and a yoke pivotally connected to said piston and adjustably attachable to said lever at any one of a plurality of points on said lever differently spaced from the pivotal axis of said lever, said cylinder being pivotally mounted to swing about an axis parallel with the pivotal axis of said lever.

12. The combination of claim 3 in which said cylinder is mounted to swing about an axis perpendicular to the line of movement of said piston and in which the operative connection between said piston and said shiftable element comprises a lever mounted for oscillation about an axis parallel with said first-mentioned axis and operatively connected with said shiftable element, and means connecting said piston with said lever at any one of a plurality of points differently spaced from the axis of oscillation of said lever.

13. The combination of claim 3 in which said cylinder is mounted to swing about an axis perpendicular to the line of movement of said piston and in which the operative connection between said piston and said shiftable element comprises a lever mounted for oscillation about an axis parallel with said first-mentioned axis and operatively connected with said shiftable element, said lever having a portion angularly related to its main body and inclined toward said first-mentioned axis, and means connecting said piston with said lever at any one of a plurality of points on said angularly related portion differently spaced from the axis of oscillation of said lever.

14. The combination of claim 3 in which said cylinder is mounted to swing about an axis perpendicular to the line of movement of said piston and in which the operative connection between said piston and said shiftable element comprises a lever mounted for oscillation about an axis parallel with said first-mentioned axis and operatively connected with said shiftable element, a second lever operatively but resiliently connected to said first-mentioned lever, and means connecting said piston with said second lever at any one of a plurality of points differently spaced from the axis of oscillation of said levers.

IRVIN V. FALK.